United States Patent
Parmar et al.

(10) Patent No.: US 10,355,554 B2
(45) Date of Patent: Jul. 16, 2019

(54) ELECTRIC POWERED LINEAR ACTUATOR

(71) Applicant: Caterpillar Inc., Peoria, IL (US)

(72) Inventors: Nainesh Parmar, Bloomington, IL (US); Kevin Martin, Washburn, IL (US)

(73) Assignee: Caterpillar Inc., Deerfield, IL (US)

(*) Notice: Subject to any disclaimer, the term of this patent is extended or adjusted under 35 U.S.C. 154(b) by 183 days.

(21) Appl. No.: 15/477,886

(22) Filed: Apr. 3, 2017

(65) Prior Publication Data
US 2018/0287458 A1 Oct. 4, 2018

(51) Int. Cl.
| F15B 15/06 | (2006.01) |
| F16H 25/20 | (2006.01) |
| H02K 7/06 | (2006.01) |
| H02K 7/116 | (2006.01) |
| E02F 9/20 | (2006.01) |
| E02F 3/42 | (2006.01) |
| E02F 9/22 | (2006.01) |
| E02F 3/76 | (2006.01) |

(52) U.S. Cl.
CPC ............. *H02K 7/06* (2013.01); *E02F 3/422* (2013.01); *E02F 3/425* (2013.01); *E02F 9/2058* (2013.01); *F16H 25/20* (2013.01); *H02K 7/116* (2013.01); *E02F 3/76* (2013.01); *E02F 9/2271* (2013.01); *F16H 2025/2075* (2013.01); *F16H 2025/2087* (2013.01); *H02K 2207/03* (2013.01)

(58) Field of Classification Search
CPC ... H02K 7/00; H02K 7/06; H02K 7/11; H02K 7/116; H02K 29/03; E02F 3/00; E02F 3/42; E02F 3/422; E02F 3/425; E02F 3/76; F15B 15/00; F15B 15/02; F15B 15/06; E05F 15/00; E05F 15/06; E05F 15/62; E05F 15/622; F16H 25/00; F16H 25/20; F16H 25/2015; F16H 25/2056; F16H 25/22; F16H 25/24; F16H 27/02; F16H 29/02

See application file for complete search history.

(56) References Cited

U.S. PATENT DOCUMENTS

| 6,734,582 | B2 | 5/2004 | Corbett, Jr. et al. |
| 7,066,045 | B2 | 6/2006 | Krause |
| 7,938,473 | B2 * | 5/2011 | Paton ............ B60J 5/101 296/146.8 |
| 2007/0137331 | A1 * | 6/2007 | Kachouh ............ F16H 25/2056 74/89.23 |
| 2009/0044645 | A1 * | 2/2009 | Buescher ............ F16H 25/20 74/89 |
| 2011/0089879 | A1 * | 4/2011 | Duits ............ F16H 25/2015 318/468 |
| 2014/0298980 | A1 | 10/2014 | Cyren et al. |
| 2016/0010731 | A1 * | 1/2016 | Stensgaard ............ F16D 28/00 74/89.35 |

* cited by examiner

*Primary Examiner* — Tran N Nguyen
(74) *Attorney, Agent, or Firm* — Miller, Matthias & Hull

(57) ABSTRACT

An electric linear actuator includes include a housing, a puck, an actuator rod, and an electric motor. The puck is contained within the housing and configured for substantially linear motion, within the housing. The actuator rod is capable of being contained, at least in part, within the housing and configured to actuate, in a substantially linear fashion, in response to substantially linear motion of the puck. The electric motor is disposed within the rod and configured to provide mechanical force to cause the substantially linear motion of the puck, within the housing.

20 Claims, 5 Drawing Sheets

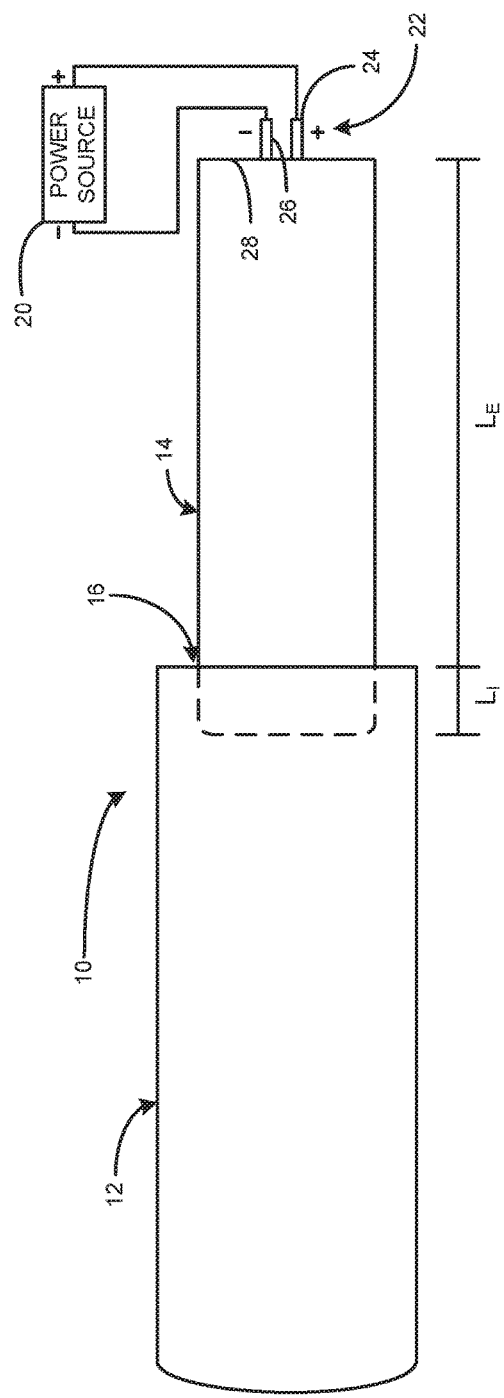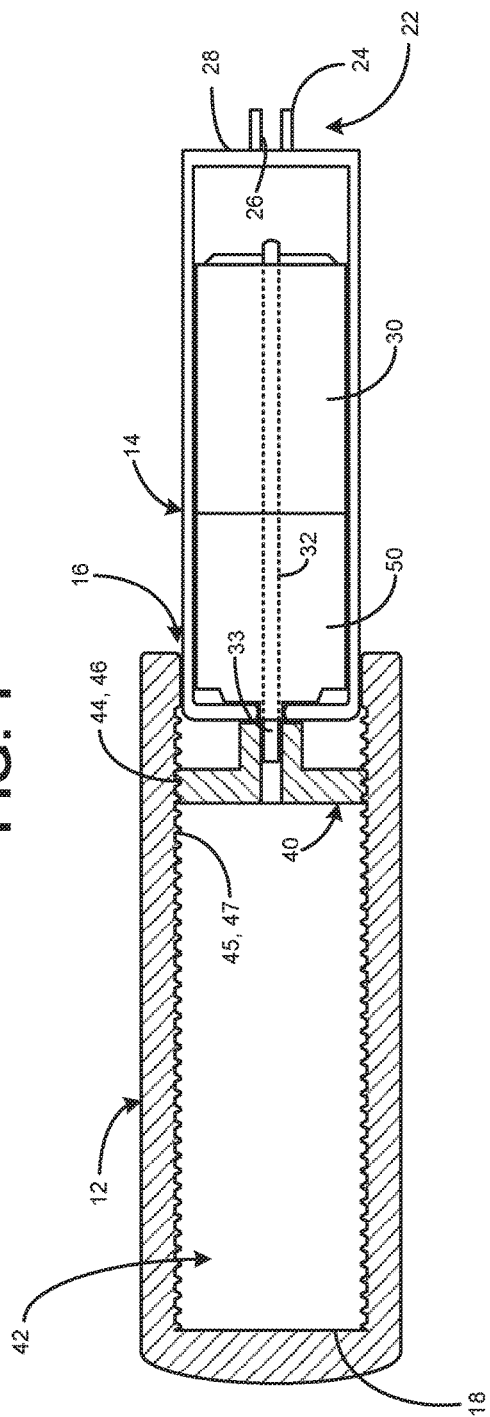

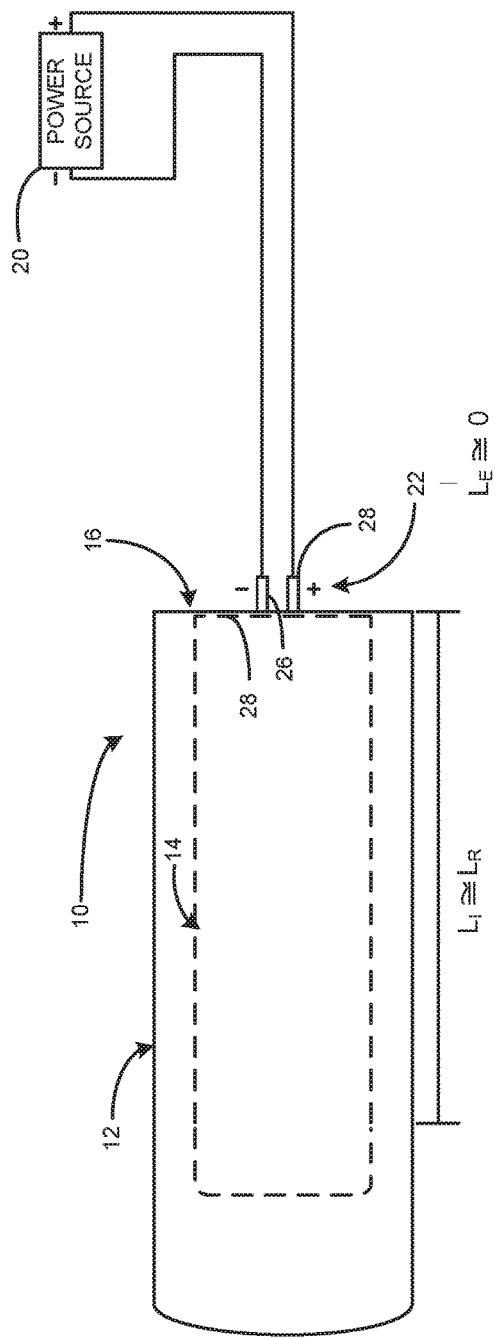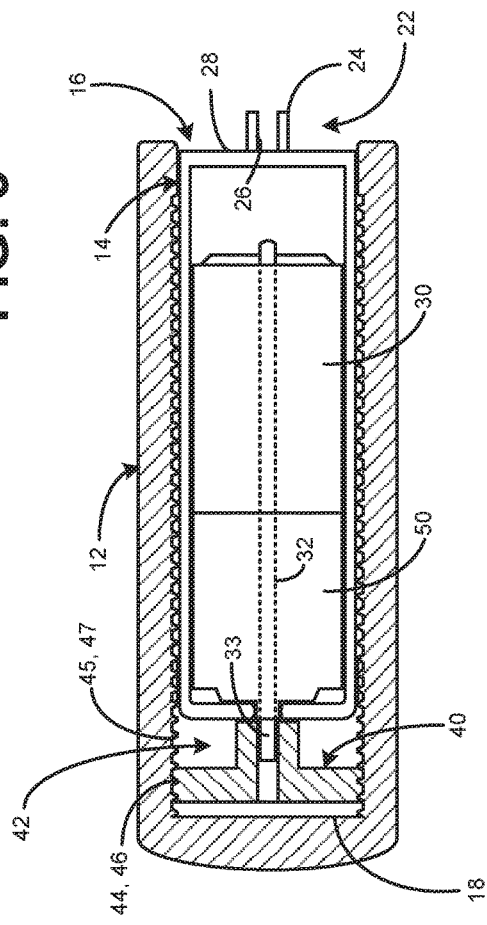
FIG. 3
FIG. 4

ELECTRIC POWERED LINEAR ACTUATOR

TECHNICAL FIELD OF THE DISCLOSURE

The present disclosure generally relates to linear actuators for machines, and, more particularly, relates to compact designs for linear actuators powered by electric motors.

BACKGROUND OF THE DISCLOSURE

A wide variety of machines, such as, but not limited to, construction machines and/or earthmoving machines (e.g., excavators, mining shovels, loaders, earth movers, bulldozers, front end loaders, motor graders, and the like), automobiles, aircraft, locomotives, and industrial pumping machinery, among other things, may utilize a plurality of actuators for positioning one or more components thereof, relative to another machine component and/or a worksite. Actuators for a machine may be associated with, or integrated within, any mechanical, electrical, and/or computer-based control systems, methods, and/or apparatus configured for controlling the machine in any manual, semi-autonomous, and/or autonomous control schemes.

Amongst a variety of actuators that may be used with machines, linear actuators are commonly used for positioning scenarios in which a machine, alone or in combination with other components, can be properly positioned via actuation in a single direction. This type of actuation is performed, generally, in a substantially straight-line path. To that end, a wide variety of linear actuators are available, utilizing a variety of mechanical and/or electromechanical inputs and/or components for performing actuation. Example linear actuators include, but are not limited to including, mechanical actuators, electro-mechanical actuators, pneumatic actuators, piezoelectric actuators, and hydraulic actuators.

In the case of heavy machinery, hydraulic actuators are commonly used for positioning heavy machine components, relative to one another and/or a worksite. Hydraulic actuators can be useful in such heavy machinery scenarios, by providing machine-universal control over such actuators, to a precise degree, via a series of control systems, pipes, pumps, and mechanisms, which communicate hydraulic fluid amongst the actuators, during operation. Due to the near-incompressible nature of most hydraulic fluids used in these systems, hydraulic actuators can be quite useful for moving heavy components of machines, with precision.

However, maintenance of hydraulic actuators and/or the associated control systems, piping and/or tubing, pumps, and mechanisms adds mechanical complexity to machines. In machines, greater mechanical complexity can lead to increased risk for component and/or system failure. Furthermore, hydraulic fluid levels and/or characteristics require regular attention, which introduces a need for increased operator and/or maintenance attention to the hydraulic system. While needs for increased attention can be replaced with currently known electronic systems and methods for monitoring hydraulic systems, these systems add further complexity to the machines, leading to more components that may be susceptible to part wear or failure.

Therefore, as an alternative to hydraulic actuators or for use in addition with hydraulic actuators, modern machines may utilize one or more electric linear actuators, which that can be configured to perform similar actuation mechanics as commonly used hydraulic actuators. An electric linear actuator utilizes one or more electric motors to generate torque. The generated torque is then converted, via one or more mechanisms of the electric linear actuator, into translational motion in a substantially straight-line path. For example, some prior art electric linear actuators have utilized external or internal motors that drive a long screw, which drives an actuator rod, within a housing or piston of the actuator. The length of the screw and/or the positioning of the motor, internal or external to the electric linear actuator, can limit the range of motion of an actuator rod, by not allowing maximum retraction of the rod within the housing.

To reduce a screw or internal size of an actuator rod, some electric actuators, such as the electric actuator disclosed in U.S. Patent Publication No. 2009/0044645, utilize a threaded spindle and an associated threaded nut, which moves translationally about the spindle and within a housing of the actuator. The electric motor of the actuator of the '645 publication drives rotational motion of the threaded spindle, which, in turn, causes the corresponding threaded nut to move translatory, within the housing, about the spindle. The translatory linear motion of the nut results in translatory linear actuation of the actuator rod of the actuator.

The threaded spindle, in the '645 publication, is rotationally driven by the electric motor and, therefore, requires connection to said motor. The spindle is, thus, connected to the motor, internal to the actuator body. Accordingly, the electric motor occupies a significant amount of space, within the actuator housing, that could otherwise be used for further retraction of the actuator rod. To that end, the range of motion of the actuator in the '645 publication may be limited, due to the placement of the motor, within the actuator housing.

In designing and/or producing electric linear actuators that are capable of being utilized to replace prior forms of actuators, it is desired that such actuators operate with the great degrees of mechanical simplicity for minimizing part failure, of operational efficiency for limiting cost of usage, and/or of spatial conservation for allowing greater range of motion with lessened mechanical and/or operational complexities. Therefore, electric actuators, for machines, which utilize innovative, compact component design and simplified operational characteristics, are desired.

SUMMARY OF THE DISCLOSURE

In accordance with one aspect of the present disclosure, an actuator is disclosed. The actuator may include a housing, a puck, an actuator rod, and an electric motor. The puck may be contained within the housing and configured for substantially linear motion, within the housing. The actuator rod may be capable of being contained, at least in part, within the housing and configured to actuate, in a substantially linear fashion, in response to substantially linear motion of the puck. The electric motor may be disposed within the rod and configured to provide mechanical force to cause the substantially linear motion of the puck, within the housing.

In accordance with another aspect of the present disclosure, a linear actuator, configured for use with a machine, is disclosed. The linear actuator may include a puck, an actuator rod, a transmission, and an electric motor. The puck may be contained within the housing and be configured for rotational motion, the rotational motion causing the puck to move translationally within the housing. The actuator rod may be capable of being contained, at least in part, within the housing and be configured to actuate, in a substantially linear fashion, with translational motion of the puck. The transmission may be coupled with the puck and configured to provide an output torque to the puck, the output torque causing the rotational motion of the puck. The electric motor may be disposed within the rod, coupled with the transmission, and configured to provide input torque to the transmission. The input torque may be converted into the output torque by the transmission.

In accordance with yet another aspect of the disclosure, a machine is disclosed. The machine may include a power source, a first machine component, a second machine component, and an actuator. The actuator may include a housing, a puck, an actuator rod, and an electric motor. The puck may be contained within the housing and configured for substantially linear motion, within the housing. The actuator rod may be capable of being contained, at least in part, within the housing and configured to actuate, in a substantially linear fashion, in response to substantially linear motion of the puck. The electric motor may be disposed within the rod and configured to provide mechanical force to cause the substantially linear motion of the puck, within the housing.

Other features and advantages of the disclosed systems and principles will become apparent from reading the following detailed disclosure in conjunction with the included drawing figures.

BRIEF DESCRIPTION OF THE DRAWINGS

FIG. 1 is a side view of a linear actuator, in accordance with an embodiment of the present disclosure.

FIG. 2 is a cross-sectional side view of the linear actuator of FIG. 1, in accordance with the embodiment of FIG. 1 and the present disclosure.

FIG. 3 is a side view of the linear actuator of FIGS. 1 and 2, wherein an actuator rod of the linear actuator is substantially recessed into a housing of the linear actuator, in accordance with the embodiment of FIGS. 1 and 2 and the present disclosure.

FIG. 4 is a cross-sectional side view of the linear actuator of FIGS. 1-3, wherein the linear actuator is in a similar state as FIG. 3, in accordance with the embodiment of FIGS. 1-3 and the present disclosure.

Figure 5:
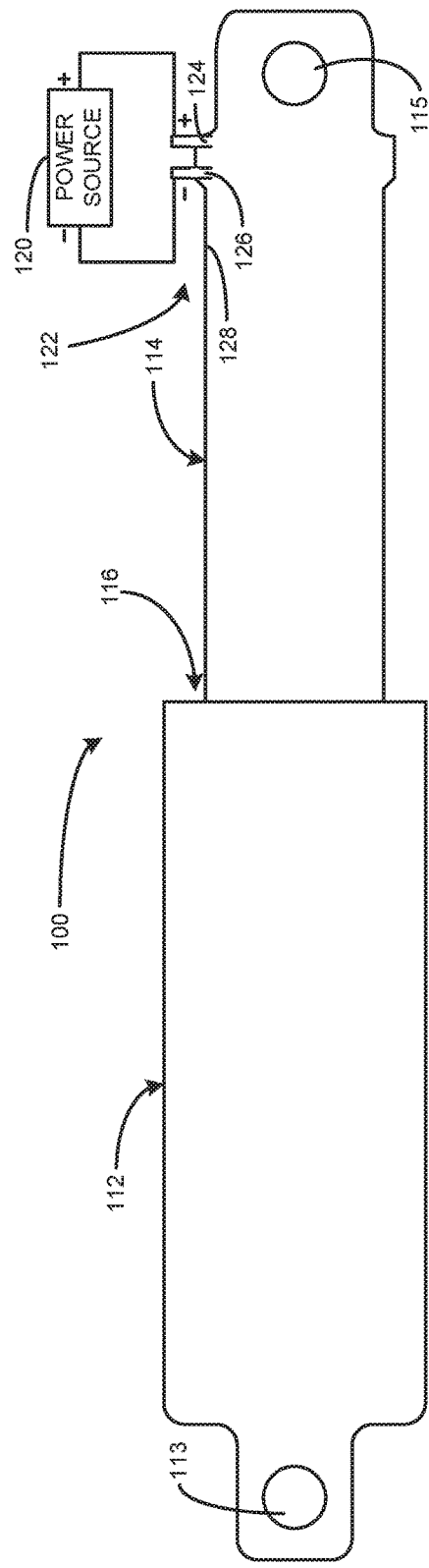
FIG. 5 is a side view of another linear actuator, in accordance with another embodiment of the disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION OF THE DISCLOSURE

Turning now to the drawings and with specific reference to FIG. 1, an electric-powered, linear actuator 10 is illustrated. The actuator 10 includes a housing 12 and an actuator rod 14. The actuator rod 14 may move, or "actuate," in a substantially linear fashion, with respect to the housing 12. To that end, the actuator rod 14 may recess within the housing 12 in a substantially linear fashion and/or the actuator rod 14 may extend outward from the housing 12 in a substantially linear fashion, during actuation. Therefore, during actuation, a variable exterior length ($L_E$), of the actuator rod 14, will protrude from an opening 16 of the housing 12, while a variable interior length ($L_I$), will be recessed within the housing 12. "Substantially linear fashion," as defined herein, refers to extension or movement of a body that travels substantially translatory about a straight line, with minor tolerances regarding the line straightness due to mechanical and/or environmental factors.

A length of the actuator rod 14 ($L_R$) may be any suitable length necessary for application of the actuator 10 and, therefore, the maximum value for one or both of $L_I$ or $L_E$ is be any length less than or equal to $L_R$. Further, in some examples, the compact design of the interior components of the actuator 10, as discussed below, may allow circumstances in which the actuator rod 14 is fully recessed within the housing 12. In such examples, as exemplified in the alternative actuation state of the actuator 10 of FIG. 3, $L_I$ may equal approximately $L_R$, while $L_E$ may equal approximately 0. For example, when a puck 40 of the linear actuator 10, as discussed in more detail below, has substantially linearly traversed to an interior end wall 18 of the inner cavity of the housing 12, the actuator rod 14 may be substantially housed by the housing 12, as shown in FIG. 3. As the puck 40 may be a small, axially-thin member, such ability to substantially abut the puck 40 to the end wall 18 allows for improved compactness of the linear actuator 10.

Accordingly, the linear actuator 10, among other apparatus disclosed herein, may be designed for improved compactness, due to the ability of the actuator rod 14 to recess further within the housing 12, in greater proportionality than prior art actuators' abilities, and/or due to the longer lengths of actuator rods 14 that may be used. This ability may further allow for a greater range or length of linear motion for the actuator rod 14, resulting in greater configurability of uses for the actuator 10.

The actuator 10 may be powered by a power source 20, which provides electrical power to the actuator 10 via, for example, a power input 22, which includes a positive terminal 24 and a negative terminal 26. Power levels input to the actuator 10 may affect actuation of the actuator rod 14 based on the input levels and/or polarity of the input power, which may be controlled by manual controls, a controller, a control system, remote control, or any other system, method, or device for providing instructions for powering the actuator 10 via the power source 20. The power input 22 may be disposed, at least in part, on an exterior surface 28 of the actuator rod 28. As depicted in both FIGS. 1 and 3, the power input 22 may remain, at least in part, exterior of the housing 12, during any stages of actuation of the actuator rod 14.

Referring now to FIGS. 2 and/or 4, and with continued reference to FIGS. 1 and 3, the electrical power provided by the power source 20 is utilized by an electric motor 30 of the actuator 10. The electric motor 30 may be any suitable electric motor 30 known in the art (e.g., electric motors including a rotor and a stator), capable of providing a mechanical force to produce a torque on, for example, a shaft 32 associated with the electric motor 30. The electric motor 30 is operatively associated with the puck 40, which is contained within the housing 12, via, for example, the shaft 32. The mechanical force provided by the electric motor 30 causes rotation of the puck 40 which may, in turn, cause the puck 40 to move substantially linearly about an interior cavity 42 of the housing 12. Further, the puck 40 is operatively associated with the actuator rod 14, such that the actuator rod 14 is configured to actuate, in a substantially linear fashion, in response to the substantially linear motion of the puck 40. In other words, as the mechanical force, provided by the electric motor 30, causes translatory motion of the puck 40, in either direction, the puck 40 effectively pushes or pulls varying lengths of the actuator rod 14 into or out of the opening 16 of the housing 12.

The mechanical force, produced by the electric motor 30, may be or may include an output torque that is received by the puck 40, via, for example, the shaft 32. The output torque received by the puck 40 causes the puck 40 to rotate within the housing 12, wherein such rotation is translated from rotational motion to substantially linear, translatory motion about the length of the housing 12 and within the interior cavity 42. To facilitate such translation of rotational to translatory motion, the puck 40 may include or define a puck threading 44 on an exterior surface of the puck 46 of the puck 40 and the housing 12 may include or define interior threading 45 on an interior wall 47 of the housing 12. In these examples, the interior threading 45 and the puck threading 44 are configured to mesh, such that rotation of the puck 40, via the output torque, causes the puck 40 to move, substantially linearly, about a course of the interior threading 45. Such meshing of the interior threading 45 and puck threading 44 may be configured such that rotation of the puck 40 in a first direction (clockwise or counter clockwise) causes the puck 40 to move linearly forward, towards the opening 16, whereas rotation of the puck 40 in the opposite direction to the first direction, causes the puck 40 to move linearly backward, towards the interior end wall 18 of the housing 12.

For altering characteristics of the output torque, prior to application to the puck 40, in some examples, the actuator 10 may include a transmission 50. The transmission 50 is coupled with both the electric motor 30 and the puck 40, such that the transmission 50 is configured to control application of the mechanical force (e.g., the output torque) that is ultimately provided to the puck 40. To that end, in such examples, the mechanical force provided, by the electric motor 30 to the transmission 50, includes an input torque, which is received by the transmission 50. The transmission 50 may include one or more gears configured to convert the input torque to an output torque; however, the transmission 50 may additionally or alternatively include any other apparatus, known in the art, for ramping up or scaling down a torque, by any factor or gear ratio. The output torque is then received by the puck 40, at a shaft end 33, and the received output torque, when applied to the puck 40, results in the substantially linear motion of the puck 40. A more detailed example of a transmission that may be utilized with a linear actuator, in accordance with the present disclosure, is discussed in more detail below, with respect to FIGS. 5-7.

FIG. 5 illustrates another example electric linear actuator 100, which may be utilized with any variety of machines. Machines which may utilize the actuator 100 may include, but are not limited to including, construction machines and/or earthmoving machines (e.g., excavators, mining shovels, loaders, earth movers, bulldozers, front end loaders, motor graders, and the like), automobiles, aircraft, locomotives, and industrial pumping machinery, among other things. Such machines may utilize a plurality of actuators for positioning one or more components thereof, relative to other machine components and/or a worksite. To that end, when associated with a machine, the actuator 100 may be associated with, or integrated within, any mechanical, electrical, and/or computer-based control systems, methods, and/or apparatus configured for control of the machine in any manual, semi-autonomous, and/or autonomous control schemes.

The actuator 100 of FIGS. 5-8 includes a variety of elements which may be similar, in appearance and/or function, to elements of the related actuator 10. To that end, such related elements of FIGS. 5-8 are presented and called-out in a 100-series format, wherein the two least significant digits of the call-out numbers for elements of FIGS. 5-8, which are similar to a related element of FIGS. 2-4, are the call-out number of its related element of FIGS. 2-4. It is to be contemplated that related elements may share similar functions as their respective related element and/or may be modified to perform similar or identical functions as their respective related element.

As depicted in FIG. 5, the linear actuator 100 includes a housing 112 and an actuator rod 114. The actuator rod 114 may move, or "actuate," in a substantially linear fashion, with respect to the housing 112. To that end, the actuator rod 114 may recess within the housing 112 in a substantially linear fashion and/or the actuator rod 114 may extend outward from the housing 112 in a substantially linear fashion, during actuation. In some examples, the housing 112 may define or include a first mechanical connection 113 and the actuator rod 114 may define or include a second mechanical connection 115. In such examples, the first mechanical connection 113 may be configured for connecting the actuator 100 to a first component of a machine, with which the actuator 100 is used, while the second mechanical connection 115 may be configured for connecting the actuator 100 to a second component of the same machine. Via such connection, the actuator 100 then is capable of positioning the first component with respect to the second component and/or positioning the second component relative to the first component, when the actuator rod 114 is actuated.

The actuator 100 may be powered by a power source 120, which provides electrical power to the actuator 100 via, for example, a power input 122, which includes a positive terminal 124 and a negative terminal 126. Power levels input to the actuator 100 may affect actuation of the actuator rod 114 based on the input levels and/or polarity of the input power, which may be controlled by manual controls, a controller, a control system, remote control, or any other system, method, or device for providing instructions for powering the actuator 100 via the power source 120. The power input 122 may be disposed, at least in part, on an exterior surface 128 of the actuator rod 114. As depicted in FIG. 1, the power input 122 may remain, at least in part, exterior of the housing 112, during any stages of actuation of the actuator rod 114.

Figure 6:
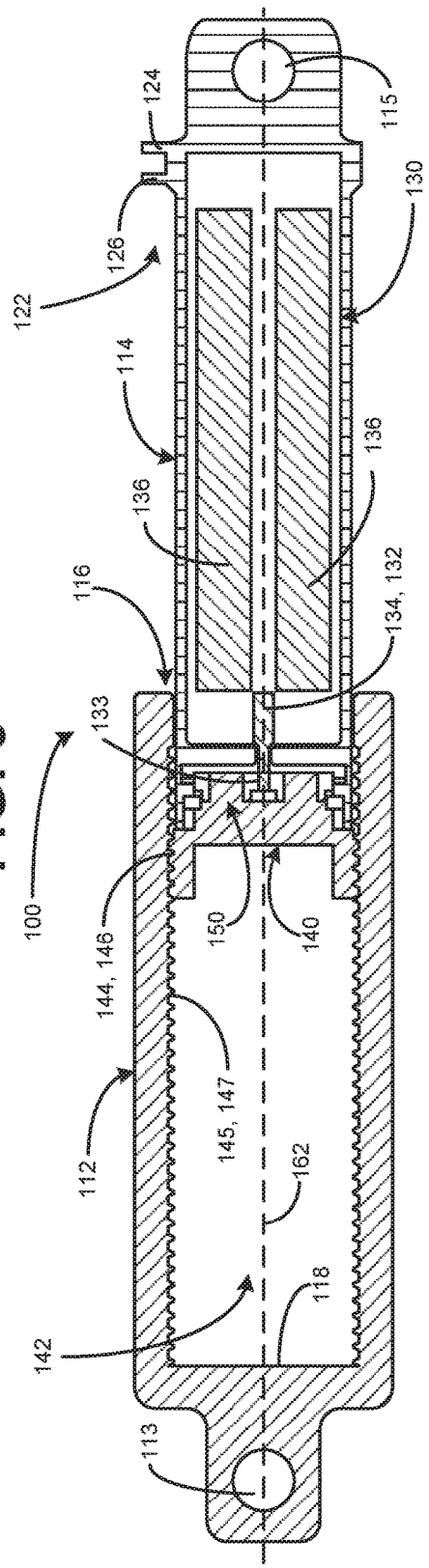
FIG. 6 is a cross-sectional side view of the actuator of FIG. 5, in accordance with the embodiment of FIG. 5 and the present disclosure.

The electrical power provided by the power source 120 is utilized by an electric motor 130 of the actuator 100, which is depicted in the cross-sectional depiction of the actuator 100 in FIG. 6. The electric motor 130 may be any suitable electric motor known in the art, capable of providing a mechanical force to produce a torque on, for example, a shaft 132 associated with the electric motor 130. As depicted in FIG. 6, the electric motor 130 includes a rotor 134 and a stator 136. The rotor 134 may be operatively associated with or may be integrated with the shaft 132, such that the rotor 134 provides input torque to a transmission 150. The motor stator 136 is disposed inside the actuator rod 114, while the motor rotor 134 is disposed, within the actuator rod 114, radially inward of the motor stator 136. In some examples, the rotor 134 may rotate in response to charging of coils of the motor stator 136, when the motor stator 136 is energized by the power source 120.

The electric motor 130 is operatively associated with a puck 140, which is contained within the housing 12, via the transmission 150. The input torque, provided by electric motor 130, is converted to an output torque, by the transmission 150, which is then provided by the electric motor 130 to cause rotation of the puck 140. Such rotation, in turn, causes the puck 140 to move substantially linearly about an interior cavity 142 of the housing 112. Further, the puck 140 is operatively associated with the actuator rod 114, such that the actuator rod 114 is configured to actuate, in a substantially linear fashion, in response to the substantially linear motion of the puck 140. In other words, as the mechanical force, provided by the electric motor 130, causes translatory motion of the puck 140, in either direction, the puck 140 effectively pushes or pulls varying lengths of the actuator rod 114 into or out of the opening 116 of the housing 112.

The output torque received by the puck 140 causes the puck 140 to rotate within the housing 112, wherein such rotation is translated from rotational motion to substantially linear, translatory motion, about the length of the housing 112 and within the interior cavity 142. To facilitate such translation of rotational to translatory motion, the puck 140 may include or define a puck threading 144 on an exterior surface of the puck 146 of the puck 140 and the housing 112 may include or define interior threading 145 on an interior wall 147 of the housing 112. In these examples, the interior threading 145 and the puck threading 144 are configured to mesh, such that rotation of the puck 140, via the output torque, causes the puck 140 to move, substantially linearly, about a course of the interior threading 145. Such meshing of the interior threading 145 and puck threading 144 may be configured such that rotation of the puck 140 in a first direction (clockwise or counter clockwise) causes the puck 140 to move transversely forward, towards the opening 116, whereas rotation of the puck 140 in the opposite direction to the first direction, causes the puck 140 to move transversely backward, towards the interior end wall 118 of the housing 112.

For altering characteristics of the input torque, provided by the electric motor 130, to generate the output torque for the puck 140, the transmission 150 is coupled with both the electric motor 130 and the puck 140, such that the transmission 150 is configured to control application of the input torque, which is ultimately input to the puck 140. The transmission 150 may be configured to ramp up and/or scale down the input torque, by any factor or gear ratio, to arrive at a desired input torque for the puck 140. The output torque, then, is received by the puck 140 at a shaft end 133, and/or any additional components associated with the shaft end 133, which applies the input torque to the puck 140, resulting in the substantially linear motion of the puck 140.

Figure 7:
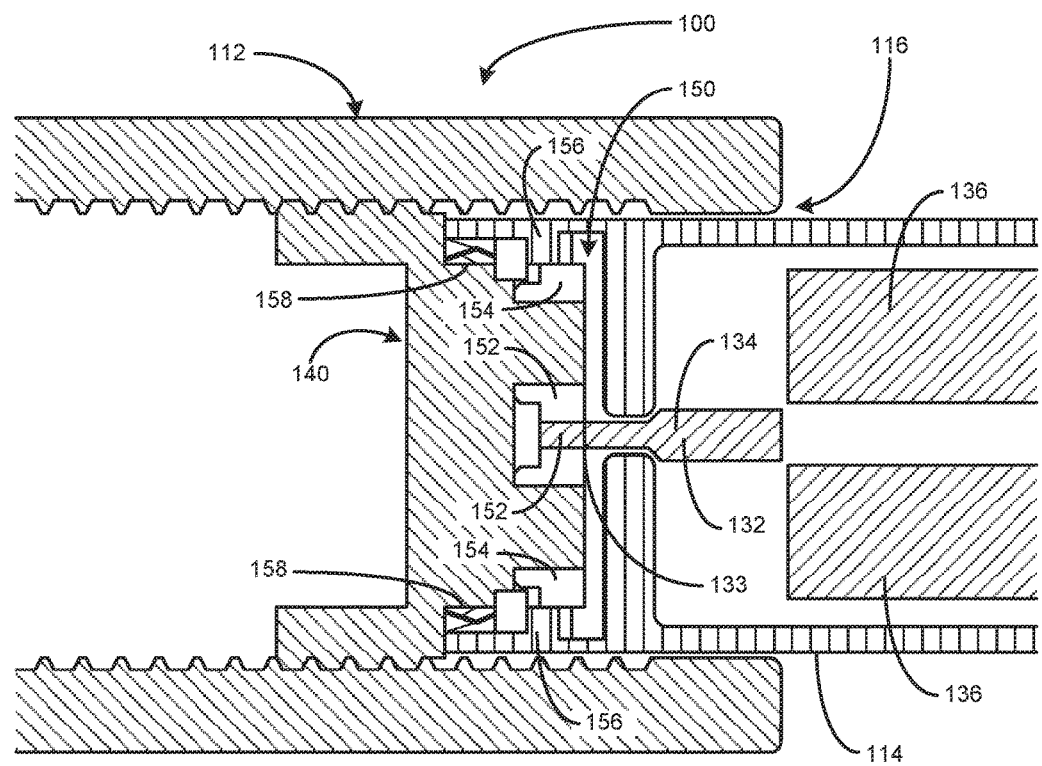
FIG. 7 is a magnified, cross-sectional side view of a portion of the actuator of FIGS. 6 and 7, illustrating a transmission of the actuator, among other things, in accordance with the embodiment of FIGS. 5 and 6 and the present disclosure.

As best illustrated in the magnified view of FIG. 7, the transmission 150 may include one or more gears which may, in some examples, form a planetary gear set for converting the input torque to the output torque. To that end, the transmission 150 may include a sun gear 152, one or more planet gears 154 disposed radially outward of the sun gear 152, and a ring gear 156 disposed radially outward of the one or more planet gears 154. The sun gear 152 is configured to receive the input torque from the electric motor 130 via, for example, the shaft 132 and/or the shaft end 133. Accordingly, the sun gear 152 rotates based on the output torque of the shaft 132. The sun gear 152 meshes with the one or more planet gears 154 and applies the output torque to the one or more planet gears 154. The one or more planet gears 154 are configured to convert the input torque to a converted torque, which may be greater than, less than, or equal to the output torque, based on any desired gear ratio and/or torque scaling factor. To that end, the one or more planet gears 154 may be sized and/or may be otherwise configured for such ratios and/or torque scaling factors, in accordance with a desired output torque. The converted torque generated by the one or more planet gears 154 is then input to the ring gear 156, which outputs the converted torque, to the puck 140, as the output torque. In other words, the converted torque is applied to the ring gear 156, which rotates with the puck 140, therefore applying the converted torque, as an output torque, to the puck 140.

In some examples, operative association between the electric motor 130 and the sun gear 152 may not only be achieved via connection to the shaft 132 and/or shaft end 133, but the shaft 132 and/or the shaft end 133 may include or define the sun gear 152. Further, in some examples, the actuator rod 114 may include or define the ring gear 156, thereby directly providing the output torque to generate the linear translatory motion of the puck 140, which drives the actuator rod 114. In order to safeguard components of the transmission 150 and/or the actuator 100, as a whole, the transmission 150 and/or the actuator 100, as a whole, may include a thrust bearing 158, disposed radially outward of the sun gear 152 and radially inward of the ring gear 156. The thrust bearing 158 may be any bearing, known in the art, which may safeguard components of the actuator 100 and/or transmission 150, during applied rotational motion.

Figure 8:
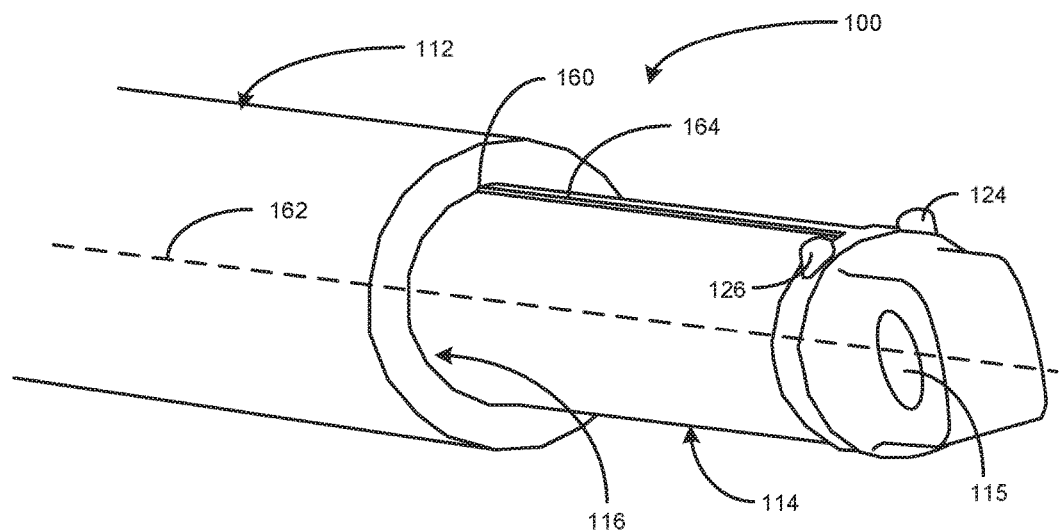
FIG. 8 is a three-dimensional perspective view of the actuator of FIGS. 5-8, showing a key and lock mechanism of the actuator, in accordance with an embodiment of the present disclosure.

Further, in some examples, such as the depiction of FIG. 8, the actuator 100 may be configured to prevent axial rotation of the actuator rod 114, relative to the housing 112. To that end, in some such examples, the housing 112 may define an axial slot 160, which extends, at least in part, parallel with a length-wise axis 162 associated with the actuator 100. Further, in such examples, the actuator rod 114 may define an axial anti-rotation tab 164, extending, at least partially, parallel with the length-wise axis 162. In such examples, the anti-rotation tab 164 is configured to axially lock with the axial slot 160, such that axial rotation of the actuator rod 114, relative to the housing 112, is prevented.

Similar to the actuator 10, the linear actuator 100 may be designed for improved compactness, due to the ability of the actuator rod 114 to recess further within the housing 112, in greater proportionality than prior art actuators' abilities, and/or due to the longer lengths of actuator rods used. This ability may further allow for a greater range or length of linear motion for the actuator rod 114, resulting in greater configurability of uses for the actuator 100, with a greater number of uses with different machines.

INDUSTRIAL APPLICABILITY

The present disclosure relates generally relates to linear actuators for machines, and, more particularly, relates to compact designs for linear actuators powered by electric motors. By providing an electric linear actuator, in which the electric motor is housed by the actuator rod, the linear actuator is capable of having greater ranges of motion and/or greater mechanical compactness, as compared to other, prior art, electric linear actuators. To that end, such compactness and range of motion improvements may be useful in applying one model of such an actuator to a multitude of different mechanical applications, without having to redesign or resize housing and/or rod components, as the range of motion and/or compact size allow the actuator to be suited to a greater number of mechanical applications.

To that end, the actuators 10, 100 disclosed herein may be applicable to a wide variety of machines and/or mechanical or electromechanical applications. Machines which may utilize the actuator 100 may include, but are not limited to including, construction machines and/or earthmoving machines (e.g., excavators, mining shovels, loaders, earth movers, bulldozers, front end loaders, motor graders, and the like), automobiles, aircraft, locomotives, and industrial pumping machinery, among other things. Such machines may utilize a plurality of actuators 10, 100 for positioning one or more components thereof, relative to other machine components and/or a worksite. To that end, when associated with a machine, the actuators 10, 100 may be associated with, or integrated within, any mechanical, electrical, and/or computer-based control systems, methods, and/or apparatus configured for control of the machine in any manual, semi-autonomous, and/or autonomous control schemes.

The actuators 10, 100 of the present disclosure may be applicable to any machine. For example, such actuators 10, 100 may be utilized in any machines that performs some type of operation associated with an industry such as mining, construction, farming, transportation, or any other industry known in the art, such as the, merely exemplary, machine 200 shown in FIG. 9 and discussed below.

The machine 200, having an implement 212, is depicted, generally, as an excavator-type machine. The work implement 212 connected to the machine 200 may be utilized for a variety of tasks including, but not limited to, loading, compacting, lifting, brushing and may include, for example, buckets, compactors, forked lifting devices, brushes, grapples, cutters, shears, blades, breakers, hammers, augers, and the like.

Figure 9:
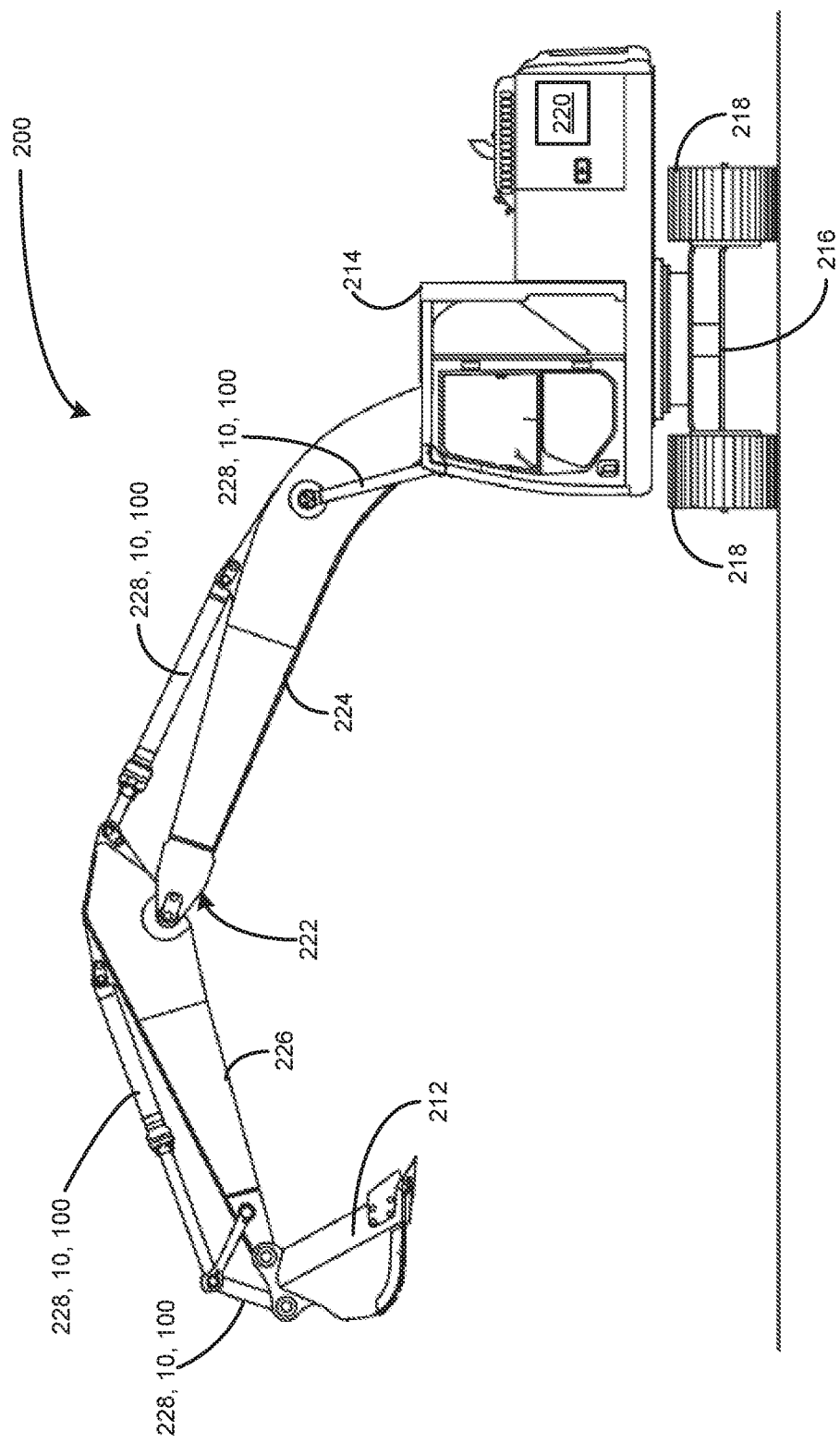
FIG. 9 is a first example machine that may utilize one or more of the actuators of FIGS. 1-8, in accordance with an embodiment of the disclosure.

As depicted in FIG. 9, the machine 200 may include a housing 214 disposed on top of and supported by an undercarriage 216. The undercarriage 216 may be associated with one or more ground engaging devices 218, which may be used for mobility and propulsion of the machine 200. The ground engaging devices 218 are shown as a pair of continuous tracks; however, the ground engaging devices 218 are not limited to being continuous tracks and may additionally or alternatively include other ground engaging devices such as rotatable wheels. A power source 220 is may provide power to the propel or otherwise move the ground engaging devices 218 and/or may power any other systems or devices of the machine 200. The power source 220 may include one or more power sources, such as internal combustion engines, electric motors, fuel cells, batteries, ultra-capacitors, electric generators, and/or any power source which would be known by a person having ordinary skill in the art. Such a power source 220 may further be used to power various motion of machine 200 or any other elements and control systems associated with the machine 200 and/or implement 212.

The machine 200 may further include a variety of machine components, including, but not limited to a crane 222, which may include a boom 224 operatively coupled with a stick 226. The implement 212 may be attached to the crane 222 at, for example, a distal end of the stick 226. For positioning the implement 212, the crane 222 and, as associated elements, the boom 224 and stick 226, may be controlled by any associated controllers and control systems. During control of the machine 200, the implement 212, and the crane 222, physical movement of said components may be performed using a plurality of actuators 228.

The plurality of actuators 228 may include and/or be embodied by one or more of the above-discussed actuators 10, 100. For example, one of the actuators 10, 100, 228 may be configured to position the boom 224 relative to the housing 214, one of the actuators 10, 100, 228 may be configured to position the stick 226 relative to the boom 224, and/or one of the actuators 10, 100, 228 may be configured to position the implement 212 relative to the stick 226. Of course, additional or alternative configurations of the actuators 10, 100, 228 may be contemplated and utilized in conjunction with the machine 200. To that end, use of actuators 10, 100 with a machine, such as the machine 200, may lessen the need for certain mechanical control components, associated with prior art, non-electric actuators. By providing compact design with extended range of motion, the actuators 10, 100 may be more suitable for replacing non-electric actuators in machines, in comparison to replacement suitability of prior art electric actuators.

It will be appreciated that the present disclosure provides actuators, electric linear actuators, and machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. An actuator comprising:
   a housing;
   a puck contained within the housing and configured for substantially linear motion within the housing;
   an actuator rod capable of being contained, at least in part, within the housing and configured to actuate, in a substantially linear fashion, in response to substantially linear motion of the puck; and
   an electric motor disposed within the actuator rod and configured to provide mechanical force to cause the substantially linear motion of the puck, within the housing.

2. The actuator of claim 1, wherein the mechanical force produced by the electric motor includes, at least, an output torque, the output torque received by the puck and causing the puck to rotate within the housing and causing the substantially linear motion of the puck.

3. The actuator of claim 2, wherein the housing includes interior threading on an interior wall of the housing,
   wherein the puck includes puck threading on an exterior surface of the puck, and
   wherein the interior threading and the puck threading are configured to mesh, such that rotation of the puck, via the output torque, causes the puck to move, substantially linearly, about a course of the interior threading.

4. The actuator of claim 1, further comprising a power input, including power input terminals, for receiving electrical power from a power source and providing the electrical power to the electric motor, the power input disposed, at least in part, on an exterior surface of the actuator rod.

5. The actuator of claim 4, wherein the power input remains, at least in part, exterior of the housing, during the substantially linear motion of the puck and actuating of the actuator rod.

6. The actuator of claim 1, further comprising a transmission, the transmission coupled with both the electric motor and the puck and configured to control application of the mechanical force provided to the puck.

7. The actuator of claim 6, wherein the mechanical force produced by the electric motor includes, at least, an input torque, the input torque received by the transmission,
wherein the transmission includes one or more gears configured to convert the input torque to an output torque, and
wherein the puck receives the output torque, the output torque causing the puck to rotate within the housing, such rotation causing the substantially linear motion of the puck.

8. The actuator of claim 1, wherein, when the puck has substantially linearly traversed to an interior end wall of an inner cavity of the housing, the actuator rod is substantially housed by the housing.

9. A linear actuator configured for use with a machine, the linear actuator comprising:
a housing;
a puck contained within the housing and configured for rotational motion, the rotational motion causing the puck to move translationally within the housing;
an actuator rod capable of being contained, at least in part, within the housing and configured to actuate, in a substantially linear fashion, with translational motion of the puck;
a transmission coupled with the puck and configured to provide a output torque to the puck, the output torque causing the rotational motion of the puck; and
an electric motor disposed within the actuator rod, coupled with the transmission, and configured to provide input torque to the transmission, the input torque converted into the output torque, by the transmission.

10. The linear actuator of claim 9, wherein the transmission includes
a sun gear configured to receive the input torque from the electric motor,
one or more planet gears disposed radially outward of the sun gear, configured to receive the input torque and output a converted torque; and
a ring gear rotationally disposed radially outward of the one or more planet gears, coupled with the puck, and configured to receive the converted rotational torque and output converted rotational torque, as the output torque.

11. The linear actuator of claim 10, wherein the electric motor includes
a motor stator, and
a motor rotor, radially inward of the motor stator, operatively coupled with the sun gear, and providing the input torque to the sun gear.

12. The linear actuator of claim 11, wherein the electric motor further includes a motor shaft for operatively coupling the motor rotor with the sun gear.

13. The linear actuator of claim 12, wherein the motor shaft defines the sun gear.

14. The linear actuator of claim 11, further comprising a power input, including power input terminals, for providing electrical power from a power source to the electric motor, the power input disposed, at least in part, on an exterior surface of the actuator rod, and
wherein the input torque of the motor rotor is based, at least in part, on electrical input from the power input.

15. The linear actuator of claim 10, wherein the ring gear is defined by the actuator rod.

16. The linear actuator of claim 10, further comprising a thrust bearing, the thrust bearing disposed radially outward of the sun gear and radially inward of the ring gear.

17. The linear actuator of claim 9, wherein the actuator rod defines a first mechanical connection for connecting the actuator rod to a first component of the machine, and
the housing defines a second mechanical connection for connecting the actuator rod to a second component of the machine, and
the actuator is configured to, upon actuation of the actuator rod, perform one or more of positioning of the first component with respect to the second component, positioning of the second component with respect to the first component, and any combinations thereof.

18. The linear actuator of claim 8, wherein the housing defines an axial slot extending, at least partially, parallel with a length-wise axis of the linear actuator, and
wherein the actuator rod defines an axial anti-rotation tab extending, at least partially, parallel with a length-wise axis of the linear actuator, the anti-rotation tab configured to axially lock with the axial slot and prevent axial rotation of the actuator rod, relative to the housing.

19. A machine comprising:
a power source;
a first machine component;
a second machine component;
an actuator configured for positioning the first component with respect to the second component, the actuator comprising:
a housing;
a puck contained within the housing and configured for substantially linear motion within the housing;
an actuator rod capable of being contained, at least in part, within the housing and configured to actuate, in a substantially linear fashion, in response to substantially linear motion of the puck; and
an electric motor receiving electrical power from the power source, disposed within the actuator rod and configured to provide mechanical force to cause the substantially linear motion of the puck, within the housing, the mechanical force based, at least in part, on the electrical power.

20. The machine of claim 19, wherein the actuator further includes a transmission, the transmission coupled with both the electric motor and the puck and configured to control application of the mechanical force provided to the puck based, at least in part, on a level of the electrical power, received by the electric motor, and a desired output power for the actuator.

* * * * *